US006862146B2

(12) United States Patent
Ruse et al.

(10) Patent No.: US 6,862,146 B2
(45) Date of Patent: Mar. 1, 2005

(54) AFOCAL OPTICAL REARVIEW MIRROR ASSEMBLY

(75) Inventors: James A. Ruse, Allegan, MI (US); Paul L. Bourget, Kentwood, MI (US)

(73) Assignee: Magna Donnelly, Inc., Kentwood, MI (US)

( * ) Notice: Subject to any disclaimer, the term of this patent is extended or adjusted under 35 U.S.C. 154(b) by 0 days.

(21) Appl. No.: 10/250,192

(22) Filed: Jun. 11, 2003

(65) Prior Publication Data

US 2003/0227698 A1 Dec. 11, 2003

Related U.S. Application Data

(60) Provisional application No. 60/319,305, filed on Jun. 11, 2002.

(51) Int. Cl.[7] .......................... G02B 17/00; G02B 5/10; G02B 5/08
(52) U.S. Cl. ..................... 359/730; 359/726; 359/858; 359/861
(58) Field of Search ................................. 359/726–731, 359/733–736, 744, 630, 632–634, 850, 856, 867, 631, 843, 857, 858, 861

(56) References Cited

U.S. PATENT DOCUMENTS

| 3,674,334 A | 7/1972 | Offner ......................... 359/366 |
| 5,009,494 A | 4/1991 | Iossi et al. .................. 359/366 |
| 5,221,990 A | 6/1993 | Cook ........................... 359/399 |
| 5,559,640 A | 9/1996 | Vachss et al. ............... 359/838 |
| 6,033,078 A | 3/2000 | Su et al. ...................... 359/856 |
| 6,116,742 A * | 9/2000 | Ahn ........................... 359/843 |
| 2002/0063976 A1 | 5/2002 | Kho ............................ 359/834 |

* cited by examiner

Primary Examiner—Georgia Epps
Assistant Examiner—Jack Dinh
(74) Attorney, Agent, or Firm—McGarry Bair PC

(57) ABSTRACT

The invention comprises an afocal lens and mirror assembly comprising an objective lens which gathers light from an object and a field lens which transmits light to a driver's eye to provide an image having sufficient brightness, clarity, and accuracy. The light passing between the objective lens and the field lens is conditioned through an assembly of lenses and reflective elements to produce the image.

56 Claims, 14 Drawing Sheets

AFOCAL OPTICAL REARVIEW MIRROR ASSEMBLY

CROSS REFERENCE TO RELATED APPLICATIONS

This application claims the benefit of U.S. provisional application Ser. No. 60/319,305, filed Jun. 11, 2002, which is incorporated herein in its entirety.

BACKGROUND OF INVENTION

1. Field of the Invention

The invention relates to a vehicular rearview mirror assembly having multiple lens elements and mirror elements. In one aspect, the rearview mirror assembly has an image having minimal distortion and optimal accuracy.

2. Description of the Related Art

Mirrors are ubiquitous for contemporary vehicles. Vehicular mirrors have long been used to aid the driver in operating the vehicle, especially in improving the rearward view of the driver. Rearview mirrors are typically mounted to the exterior of the vehicle at the front of the driver's and front passenger's doors adjacent to the lower corner of the side windows. This places the rearview mirrors forward of the driver, where the driver can readily shift his line of sight from the road to the mirrors, and where the mirrors will not obstruct the driver's front and side vision. In order to provide a sufficiently large image for the driver's observation, the mirror assemblies are generally large and extend outwardly of the vehicle a significant distance.

Such external rearview mirrors can disrupt the aerodynamics of the vehicle and are susceptible to damage. Furthermore, the mirrors require frequent cleaning in order to maintain the quality of the image and any interruption in the light passing from the mirror through the window to the interior of the vehicle, such as a broken window or dirt, can render the mirror ineffective. Thus, attempts have been made to design a mirror assembly having a smaller size and providing a high-quality image regardless of the condition of the window.

U.S. Pat. No. 6,033,078 to Su et al., issued Mar. 7, 2000, discloses a multi-component rearview mirror unit comprising lenses and reflecting elements. However, the optical system disclosed in the Su et al. patent substitutes a focal system for an afocal system, produces an image that is fuzzy and distorted, produces an image that is insufficiently bright, produces an unacceptably high angular magnification, has a high weight and manufacturing costs, and can cause driver eye strain. Furthermore, the optical system disclosed in the Su et al. patent results in improper light path replication compared to a conventional mirror system. The input collimated light is converted to output diverging light, requiring eye refocusing. Additionally, the system lacks defining and limiting apertures. Artwork displays a lack of optical refraction at key surfaces which creates a light ray path error. The multiple curved lenses result in field distortion and small petzfal radii. Finally, the aspheric surfaces are inadequate for correcting image aberrations.

SUMMARY OF INVENTION

The invention comprises an afocal lens and mirror assembly comprising an objective lens which gathers light from an object and a field lens which transmits light to a driver's eye to provide an image having sufficient brightness, clarity, and accuracy. The light passing between the objective lens and the field lens is conditioned through an assembly of lenses and reflective elements to transfer ray bundles into the eye.

A rearview mirror assembly mounted to the side of a motor vehicle operated by an operator for producing an image of an object located outside the vehicle comprises an interior element housing having a first longitudinal axis, an exterior element housing having a second longitudinal axis, the interior element housing in cooperative communication with the exterior element housing so that the first longitudinal axis and the second longitudinal axis define an acute angle therebetween, a first light conditioning assembly adapted to receive light entering the exterior element housing, a second light conditioning assembly adapted to transmit light through the interior element and a moveable reflective element assembly comprising at least one moveable reflective element for adjusting the field of view of the object to adjust the operator's view of the image.

In one aspect, the invention relates to an afocal rearview mirror assembly for a motor vehicle operated by an operator for producing an image of an object located outside the vehicle, comprising: an interior element housing having a first longitudinal axis, an exterior element housing having a second longitudinal axis, the interior element housing in cooperative communication with the exterior element housing so that the first longitudinal axis and the second longitudinal axis define an acute angle therebetween, a reflective element assembly, at least a portion of which is located at the apex of the angle for reflecting light entering through the exterior element housing to exit through the interior element housing, an objective lens assembly adapted to converge light entering the exterior element housing onto the reflective element wherein the image produced on the reflective element is unfocused, and a field lens assembly adapted to diverge light reflected from the reflective element through the interior element housing wherein the image produced is focused at the operator's eyes.

In another aspect, the invention relates to a rearview mirror assembly mounted to the side of a motor vehicle operated by an operator for producing an image of an object located outside the vehicle, comprising: an interior element housing having a first longitudinal axis, an exterior element housing having a second longitudinal axis, the interior element housing in cooperative communication with the exterior element housing so that the first longitudinal axis and the second longitudinal axis define an acute angle therebetween, a reflective element assembly, at least a portion of which is located at the apex of the angle for reflecting light entering through the exterior element housing to exit through the interior element housing, a first light conditioning assembly adapted to receive light entering the exterior element housing, a second light conditioning assembly adapted to transmit light reflected from the reflective element through the interior element housing wherein the image produced is focused at the operator's eyes, and wherein the image projected onto the reflective element assembly is unfocused.

In a further aspect, the invention relates to a rearview mirror assembly mounted to the side of a motor vehicle operated by an operator for producing an image of an object located outside the vehicle, comprising: an interior element housing having a first longitudinal axis, an exterior element housing having a second longitudinal axis, the interior element housing in cooperative communication with the exterior element housing so that the first longitudinal axis and the second longitudinal axis define an acute angle therebetween, a first light conditioning assembly adapted to receive light entering the exterior element housing, a second light conditioning assembly adapted to transmit light through the interior element housing, and at least one moveable reflective element for adjusting the field of view of the object to adjust the operator's view of the image.

Various embodiments of the invention are also contemplated. The reflective element assembly can comprise at least one plane mirror. The objective lens assembly can comprise at least one convex lens. The field lens assembly can comprise at least one concave lens. The image produced on the reflective element can be inverted. The reflective element assembly can be adapted to converge the light reflected from the reflective element. The reflective element assembly can be a concave mirror. The light entering the exterior element housing can be converged to a focal point in front of the reflective element assembly to invert the image.

The reflective element assembly can be adapted to converge the light reflected from the reflective element. The reflective element assembly can be a concave mirror. The field lens assembly can comprise a compound lens. The compound lens can comprise at least one concave lens. The field lens assembly can further comprise an aperture for diverging and inverting the image. The aperture can be located between the reflective element assembly and the compound lens.

The reflective element assembly can comprise a first plane mirror and a second plane mirror. The reflective element assembly can further comprise a vertical inverter element. The vertical inverter element can comprise at least one convex lens. The vertical inverter element can comprise at least one prism. The vertical inverter element can be interposed between the first plane mirror and the second plane mirror. The objective lens assembly can comprise at least one convex lens. The field lens assembly can comprise at least one concave lens. The field lens assembly can comprise a compound lens. The compound lens can comprise at least one concave lens.

The reflective element assembly can further comprise a third mirror spaced away from the first plane mirror and the second plane mirror. The first plane mirror and the second plane mirror can be coplanar. The objective lens can be adapted to provide a wide-angle view. The objective lens can comprise at least one negative lens. The objective lens can comprise at least one compound lens.

The at least one moveable reflective element can comprise at least one plane mirror. A tilt actuator assembly can be provided for tilting the at least one moveable reflective element about at least one axis. The tilt actuator assembly can further comprise at least one jack screw. The at least one jackscrew can be attached to the at least one moveable reflective element to tilt the at least one moveable reflective element about the at least one axis.

A pivot mount can be provided for mounting the tilt actuator assembly to the at least one moveable reflective element. The at least one moveable reflective element can thereby rotate about the pivot mount. The tilt actuator assembly can further comprise at least one motor to drive the at least one jack screw.

The first light conditioning assembly can comprise at least one convex lens. The second light conditioning assembly can comprise at least one concave lens. The at least one moveable reflective element can be located intermediate the first light conditioning assembly and the second light conditioning assembly to transmit light from the first light conditioning assembly to the second light conditioning assembly.

DETAILED DESCRIPTION

The invention comprises an afocal rearview mirror assembly comprising an assembly of lenses and reflective elements providing a high-quality image to the driver of a motor vehicle. The assembly is housed in a housing mounted to the vehicle doors similar to a conventional rearview mirror with an exterior light-collecting element and an interior image element providing a high-quality image adjacent to the front windshield of the vehicle. The invention is described with respect to several embodiments comprising different assemblies of lenses and reflective elements.

Figure 1:
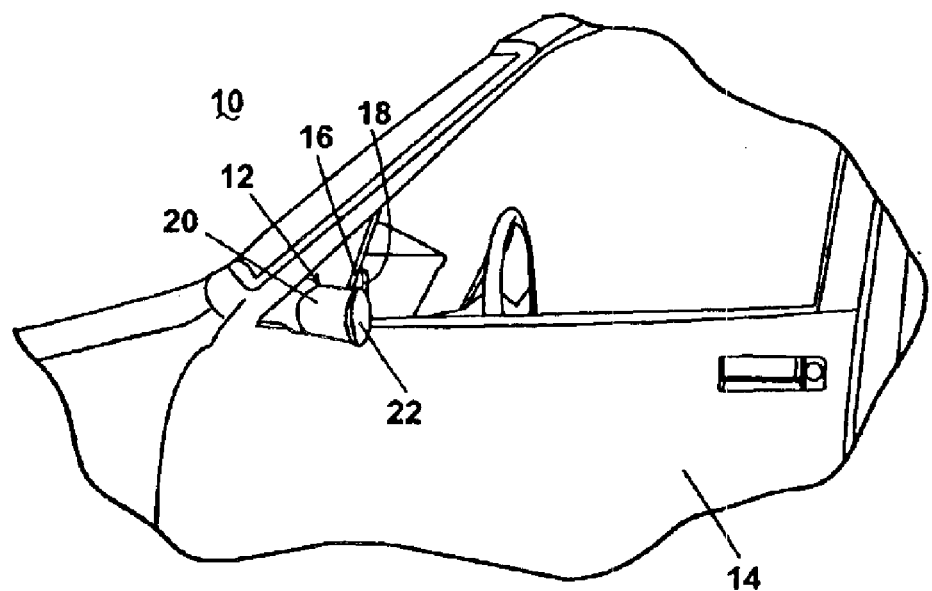
FIG. 1 is a side elevation view of a portion of the exterior of a motor vehicle comprising an afocal rearview mirror assembly according to the invention.
Figure 2:
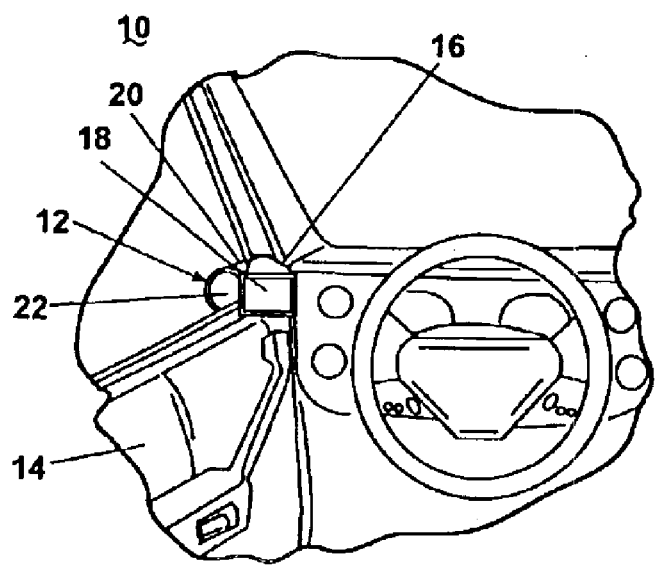
FIG. 2 is an elevation view of a portion of the interior of the motor vehicle of FIG. 1 showing a second view of the afocal rearview mirror assembly.
Figure 3:
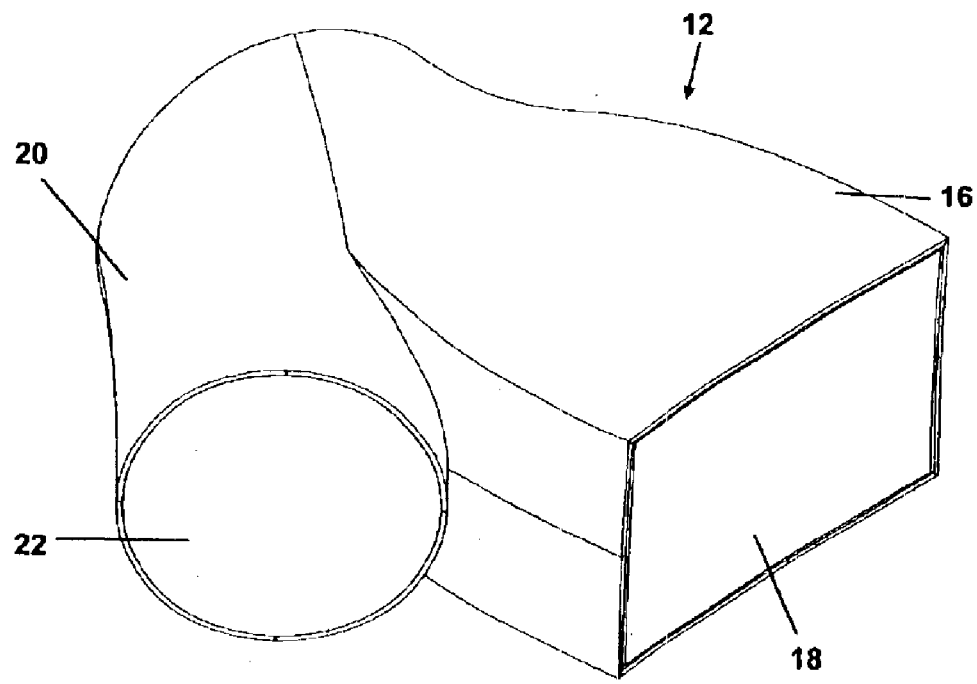
FIG. 3 is a perspective view of the afocal rearview mirror assembly of FIG. 1.
Figure 4:
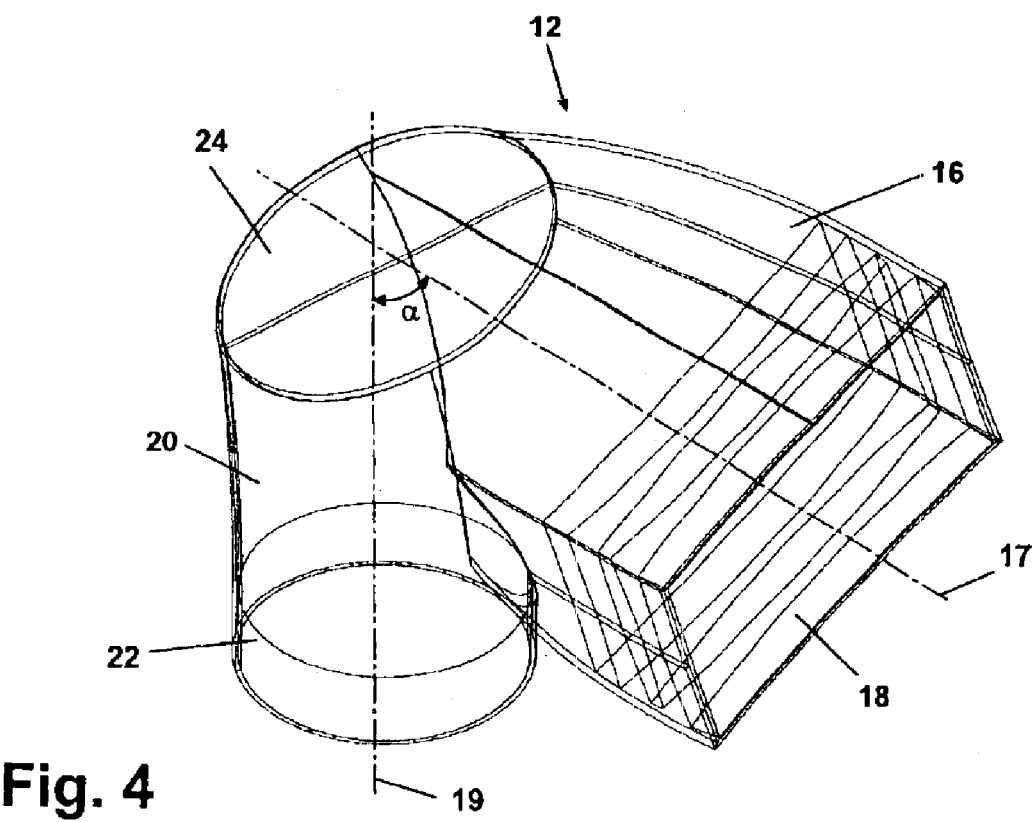
FIG. 4 is a perspective view of the afocal rearview mirror assembly of FIG. 3 showing the interior assembly of lenses and reflective elements.

A conventional motor vehicle 10, such as an automobile, is shown in FIG. 1 comprising an afocal rearview mirror 12 attached to the vehicle driver's side door 14 similar to a conventional rearview mirror. Referring to FIG. 2, the afocal rearview mirror 12 comprises an interior element housed in a housing 16 having a field lens 18 onto which an image is projected. As shown in FIGS. 3 and 4, the afocal rearview mirror 12 comprises a two-part housing comprising a hollow, generally rectilinear-shaped, box-like interior element housing 16 and a hollow, generally cylindrically-shaped exterior element housing 20 oriented to each other in a generally angular configuration so that the longitudinal axes 17, 19 of the housings 16, 20, respectively, define an acute angle $\hat{I}\pm$ therebetween. Referring to FIG. 4, a reflective element 24, such as a mirror, is located at the apex of the angle $\hat{I}\pm$ thus formed. A generally rectangular shaped field lens 18 is mounted in the interior element housing 16 at the opening thereto. A generally circular shaped objective lens 22 is mounted in the exterior element housing 20 at the opening thereto. In the preferred embodiment, the objective lens 22 comprises a multi-element lens assembly, including a lens adapted to seal the interior of the exterior element housing 20 and protect the lens assembly and the interior of the afocal rearview mirror 12 from dirt, water, and the elements. The reflective element 24 is oriented in the housing so that light entering the exterior element housing 20 parallel to the longitudinal axis thereof is reflected through the interior element housing 16 parallel to the longitudinal axis thereof.

The following descriptions of each of the embodiments of the afocal rearview mirror assembly 12 will describe the assembly of lenses and reflective elements comprising the embodiment. Each embodiment comprises a different arrangement of lenses and reflective elements, and it will be evident to one of ordinary skill in the art that the housings 16, 20 will be adapted to accommodate the assembly of lenses and reflective elements comprising the particular embodiment being described. Certain elements are common to all embodiments, and, thus, are given the same reference numerals for clarity.

Figure 5:
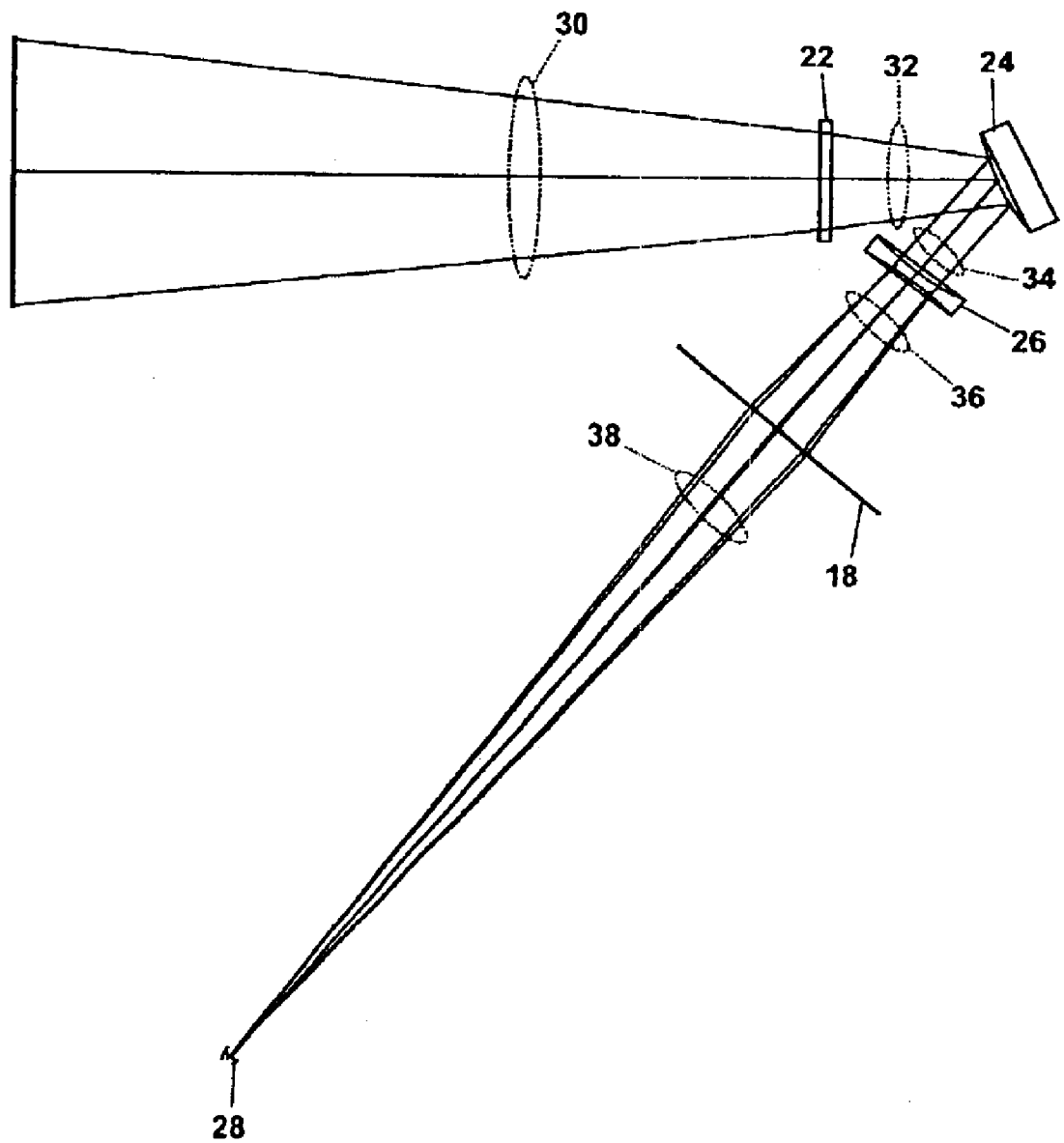
FIG. 5 is a schematic representation of the light received from an object and transmitted to a driver's eye through a first embodiment of the afocal rearview mirror assembly of FIG. 1.

Referring to FIG. 5, a first embodiment of the afocal rearview mirror assembly 12, referred to as a non-inverting system, comprises an objective lens 22, a reflective element 24, and a field lens 18. Additionally, an expander lens 26 is interposed between the reflective element 24 and the field lens 18. Incident light 30 from an object (not shown) is gathered by the objective lens 22 where it is converged 32 to impinge on the reflective element 24. The light 32 is not brought to a focus at the reflective element 24. The light 34 is collimated by and reflected from the reflective element 24 at an angle from the incident light direction, and passes through the expander lens 26 where it is diverged 36 and expanded to the field lens 18. The field lens 18 refracts the light 38 to a driver's eyes 28 which creates the image plane. Since there is no focal plane within the afocal rearview mirror assembly 12, the system is afocal. It will be evident to one of ordinary skill in the art that, for the first embodiment, the objective lens 22 and the field lens 18 can comprise either simple or compound lenses in order to produce the desired image of the desired quality at the location of the driver's eyes.

Figure 6:
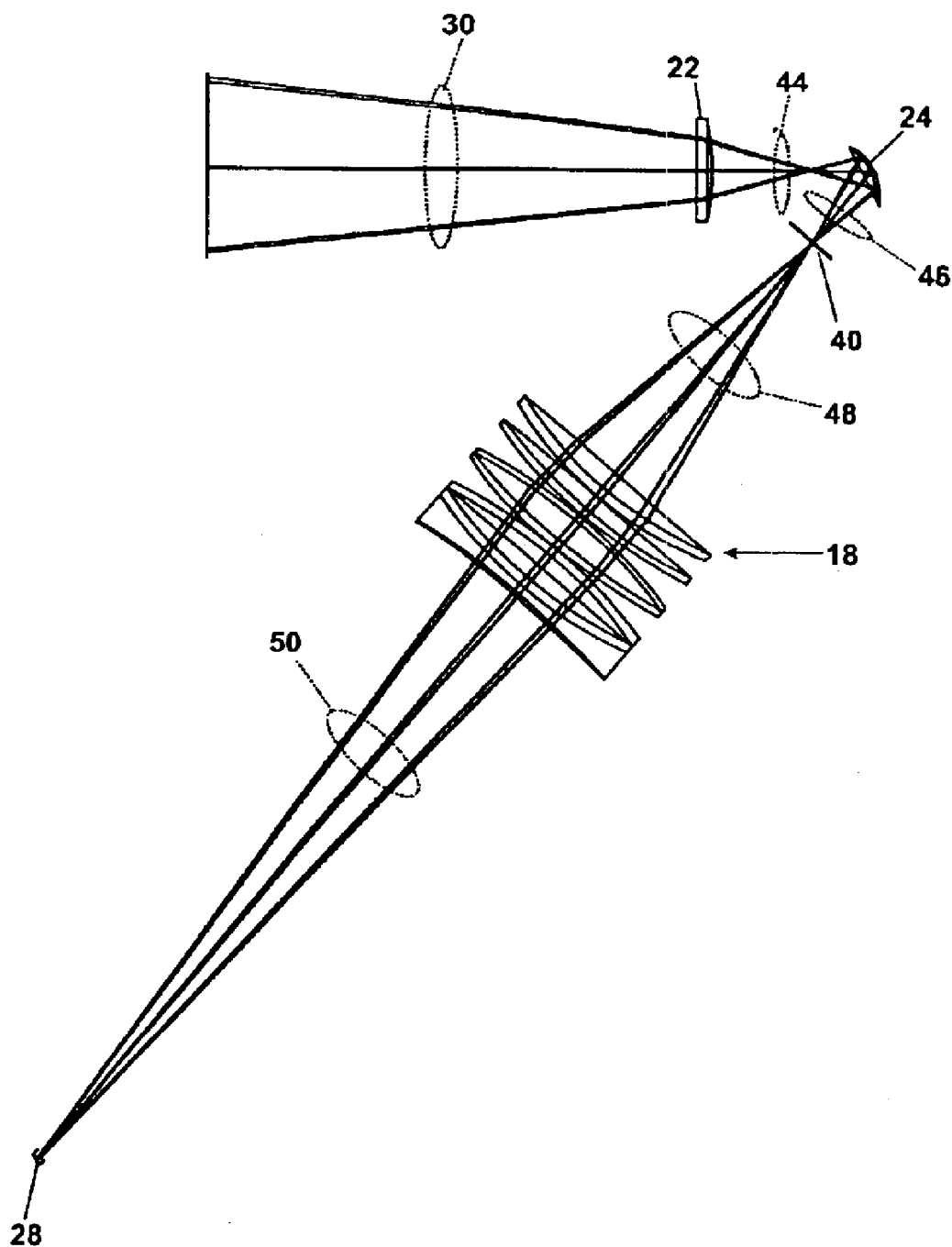
FIG. 6 is a schematic representation of the light received from an object and transmitted to a driver's eye through a second embodiment of the afocal rearview mirror assembly of FIG. 1.

A second embodiment of the invention, referred to as an inverting system, is shown in FIG. 6. The second embodiment comprises an objective lens 22, a reflective element 24, a field lens 18, and an aperture 40 interposed between the reflective element 24 and the field lens 18. The objective lens 22 gathers light 30 from an object (not shown) and focuses the light 44 to a focal point in front of the reflective element 24, thus inverting the image of the object. The reflective element 24, which is adapted to possess imaging power, refocuses the light 46 and transfers the light 46 through the aperture 40 where the image is expanded and is again inverted. The light 48 then passes through the field lens 18 where it is refracted 50 to the driver's eyes 28. The light 50 is not expanded by the field lens 18. Since there is no focal plane within the range of the eye, it operates as an afocal rearview mirror system.

Figure 7:
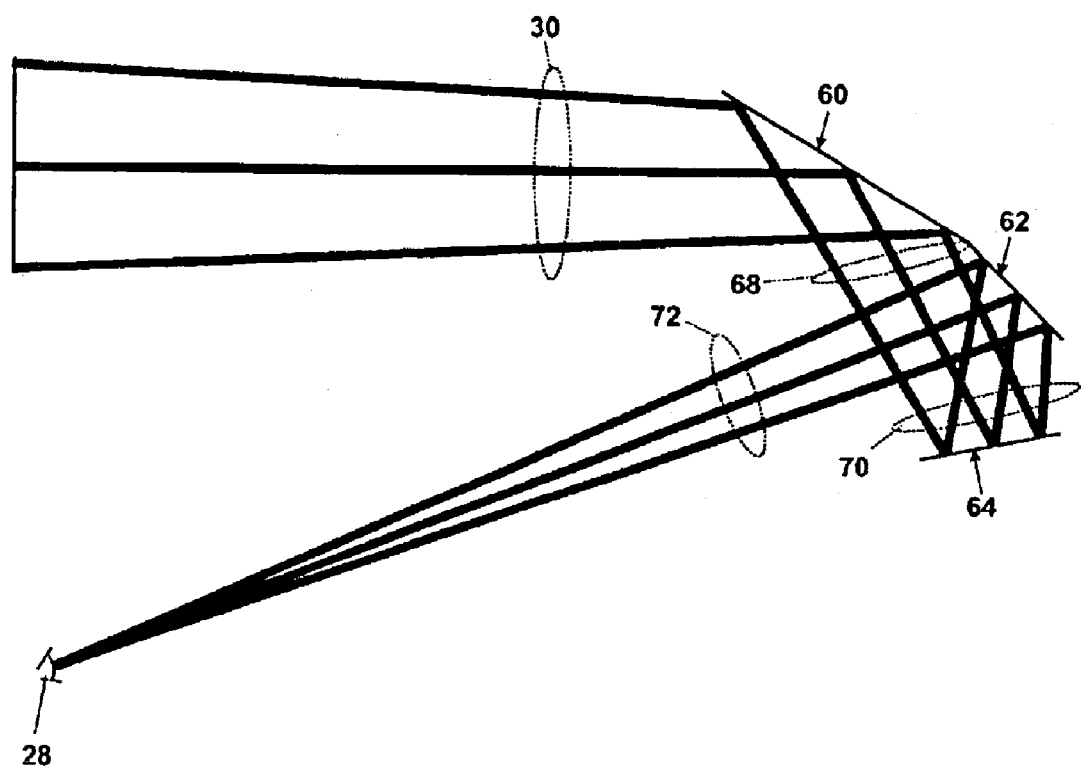
FIG. 7 is a schematic representation of the light received from an object and transmitted to a driver's eye through a third embodiment of the afocal rearview mirror assembly of FIG. 1.
Figure 8:
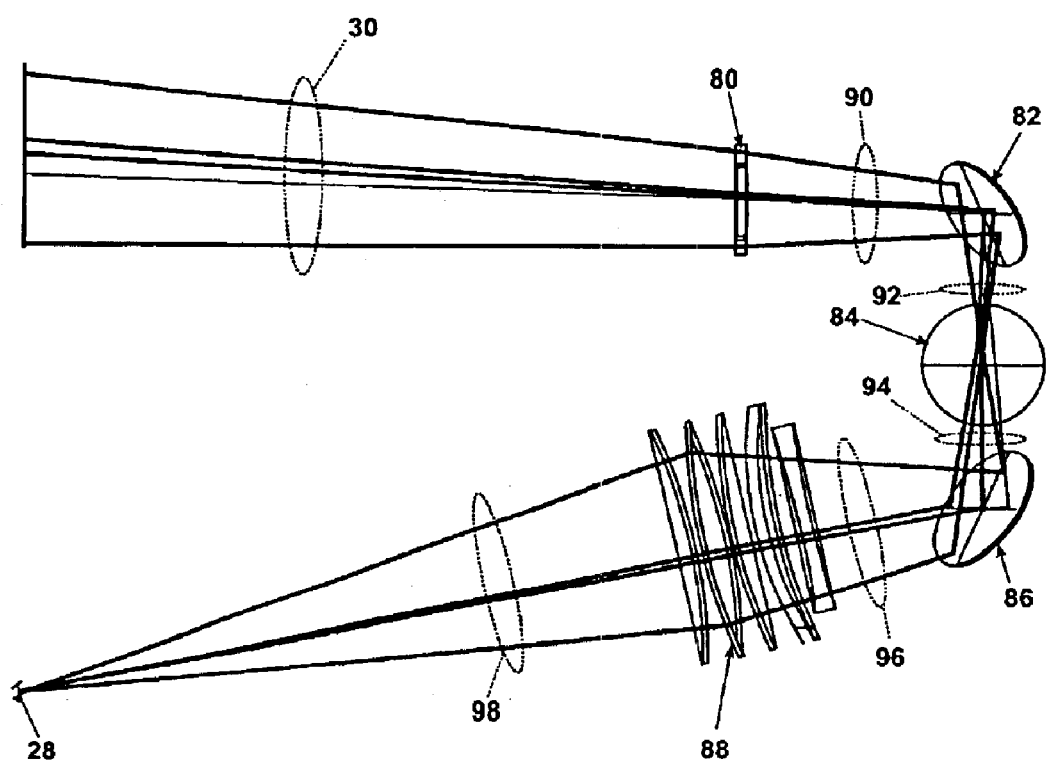
FIG. 8 is a schematic representation of the light received from an object and transmitted to a driver's eye through a fourth embodiment of the afocal rearview mirror assembly of FIG. 1.
Figure 9:
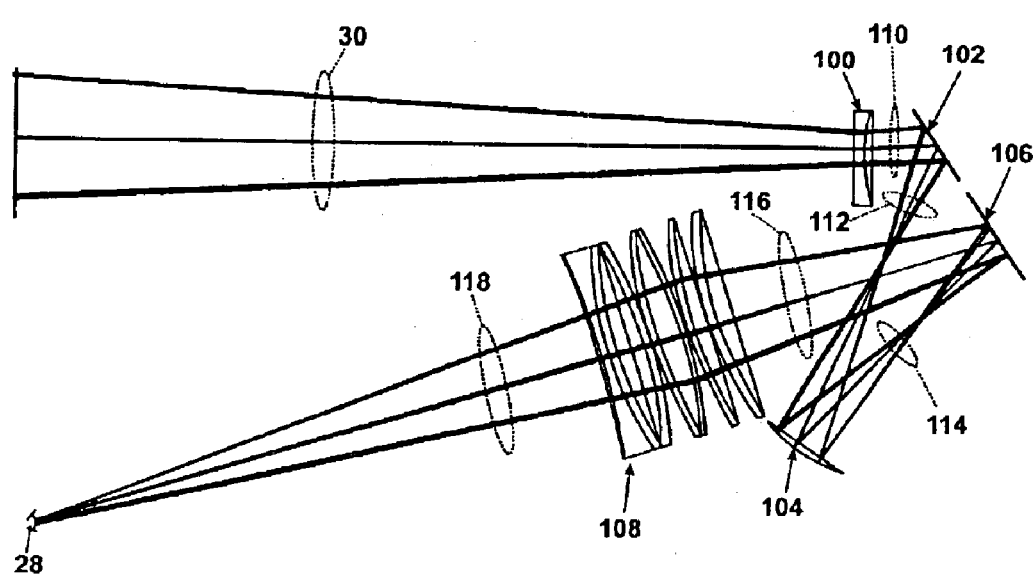
FIG. 9 is a schematic representation of the light received from an object and transmitted to a driver's eye through a fifth embodiment of the afocal rearview mirror assembly of FIG. 1.

FIGS. 7–9 show embodiments, referred to as a periscopic system, in which the light is reflected a plurality of times within the assembly. Referring to FIG. 7, the third embodiment comprises first reflective element 60, a second reflective element 62, and a third reflective element 64. The first reflective element 60 and the second reflective element 62 are preferably located generally at the apex end of the afocal rearview mirror assembly 12, and oriented to define an obtuse angle therebetween. The third reflective element 64 is preferably offset from the second reflective element 62 and oriented to define an acute angle therebetween and reflect light from the first reflective element 60 onto the second reflective element 62. Light is reflected from the first reflective element 60 to the third reflective element 64 and then to the second reflective element 62. The first reflective element 60 gathers light from an object (not shown) and converges the light onto the third reflective element 64. The light is not brought to a focus. The third reflective element 64 then funnels the light to the second reflective element 62, which transfers the light to the driver's eyes 28. Since there is no focal plane within the assembly, it is an afocal rearview mirror system. Optical power can be added to the reflective element 60-66, and additional refractive elements (not shown) can be added to correct for aberrations as needed.

A fourth embodiment is shown in FIG. 8, comprising an alternative embodiment of the periscopic assembly shown in FIG. 7. The fourth embodiment comprises an objective lens 80, a first reflective element 82, a vertical inverter element 84, such as a convex lens or a prism, a second reflective element 86, and a field lens 88. The first reflective element 82, the vertical inverter element 84, and the second reflective element 86, are preferably located generally at the apex end of the afocal rearview mirror assembly 12. Light 30 from an object (not shown) passes through the objective lens 80 where it is refracted and converged 90 onto the first reflective element 82. The light is then reflected 92 from the first reflective element 82 through the vertical inverter element 84 where it is inverted 94 onto the second reflective element 86. The light is then reflected and expanded 96 onto the field lens 88 where it is refracted and transmitted 98 to the driver's eyes 28.

FIG. 9 shows a fifth embodiment comprising yet another alternative embodiment of the periscopic assembly shown in FIG. 7. The fifth embodiment comprises an objective lens 100, a first reflective element 102, a second reflective element 104, a third reflective element 106, and a field lens 108. The first reflective element 102 and the third reflective element 106 are preferably in a coplanar orientation. The second reflective element 104 is in spaced-apart, opposed communication with the first reflective element 102 and the third reflective element 106 so that light from the first reflective element 102 is reflected by the second reflective element 104 onto the third reflective element 106. Light 30 from an object (not shown) passes through the objective lens 100 where it is refracted and converged 110 onto the first reflective element 102. The light is then reflected 112 and inverted onto the second reflective element 104. The light is again reflected 114 and inverted onto the third reflective element 106. The light 116 is then reflected and expanded onto the field lens 108 where it is refracted 118 to the driver's eyes 28.

Figure 10:
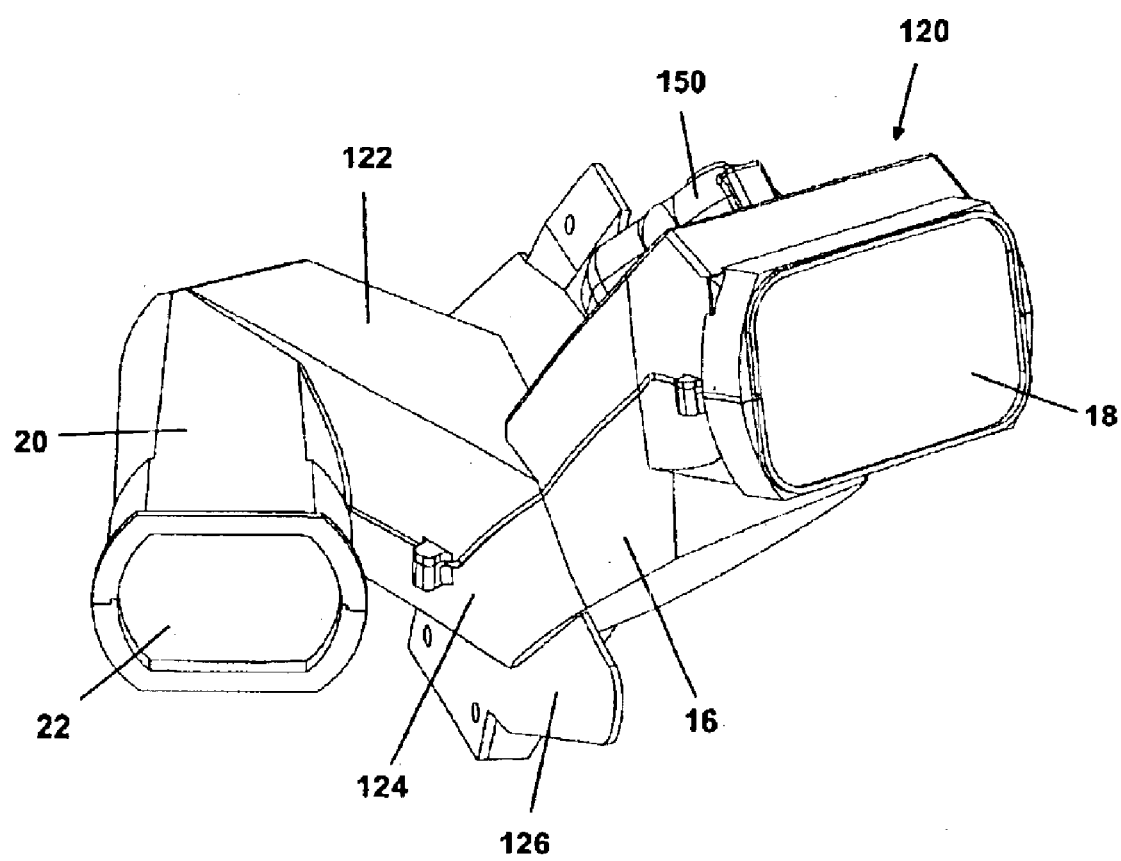
FIG. 10 is a perspective view of a sixth embodiment of the afocal rearview mirror assembly of FIG. 1.
Figure 11:
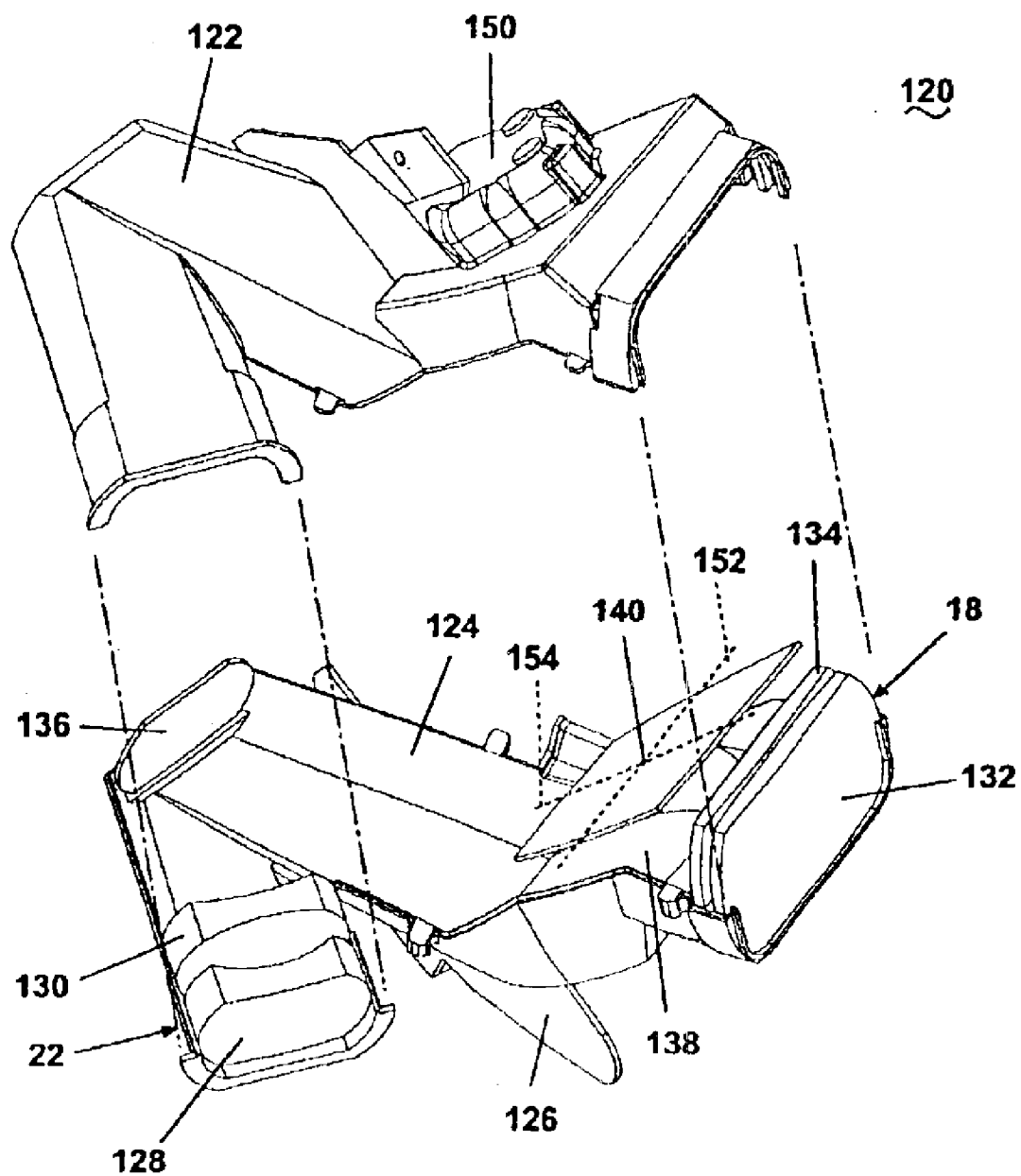
FIG. 11 is an exploded view of the afocal rearview mirror assembly shown in FIG. 10 showing an assembly of mirrors and lenses mounted in a lower housing and enclosed with an upper housing.

FIGS. 10 and 11 show a sixth embodiment of the afocal rearview mirror assembly 120 comprising the objective lens 22 and the field lense 18 mounted in a lower housing 124 and enclosed with an upper housing 122 which matingly communicates with the lower housing 124. The field lens 18 is offset vertically from the objective lens 22. The lower housing 124 is provided with a mounting bracket 126 for mounting the mirror assembly 120 to the vehicle door 14. The mirror assembly 120 comprises a two-piece objective lens 22 comprising a first objective lens element 128 and a second objective lens element 130. Preferably, the lens elements 128, 130 are concave lenses. The mirror assembly 120 also comprises a two-piece field lens 18 comprising a first field lens element 132 and a second field lens element 134. Preferably, the lens elements 132, 134 are convex lenses. The mirror assembly 120 also comprises a vertex mirror 136 at the vertex of the angle formed by the interior element housing 16 and the exterior element housing 20.

Intermediate the vertex mirror 136 and the field lens 18 are a lower intermediate mirror 138 and an upper intermediate mirror 140 in a periscopic configuration, which are positioned to reflect light from the vertex mirror 136 to the field lens 18. The upper intermediate mirror 140 is operably attached to a tilt actuator 150 for tilting the mirror 140 about a transverse axis 152 and a longitudinal axis 154, as shown in FIG. 11. The tilt actuator 150 is housed in a tilt actuator chamber 151 formed in the upper housing 122 and adapted to fixedly mount the tilt actuator 150 therein.

Figure 12:
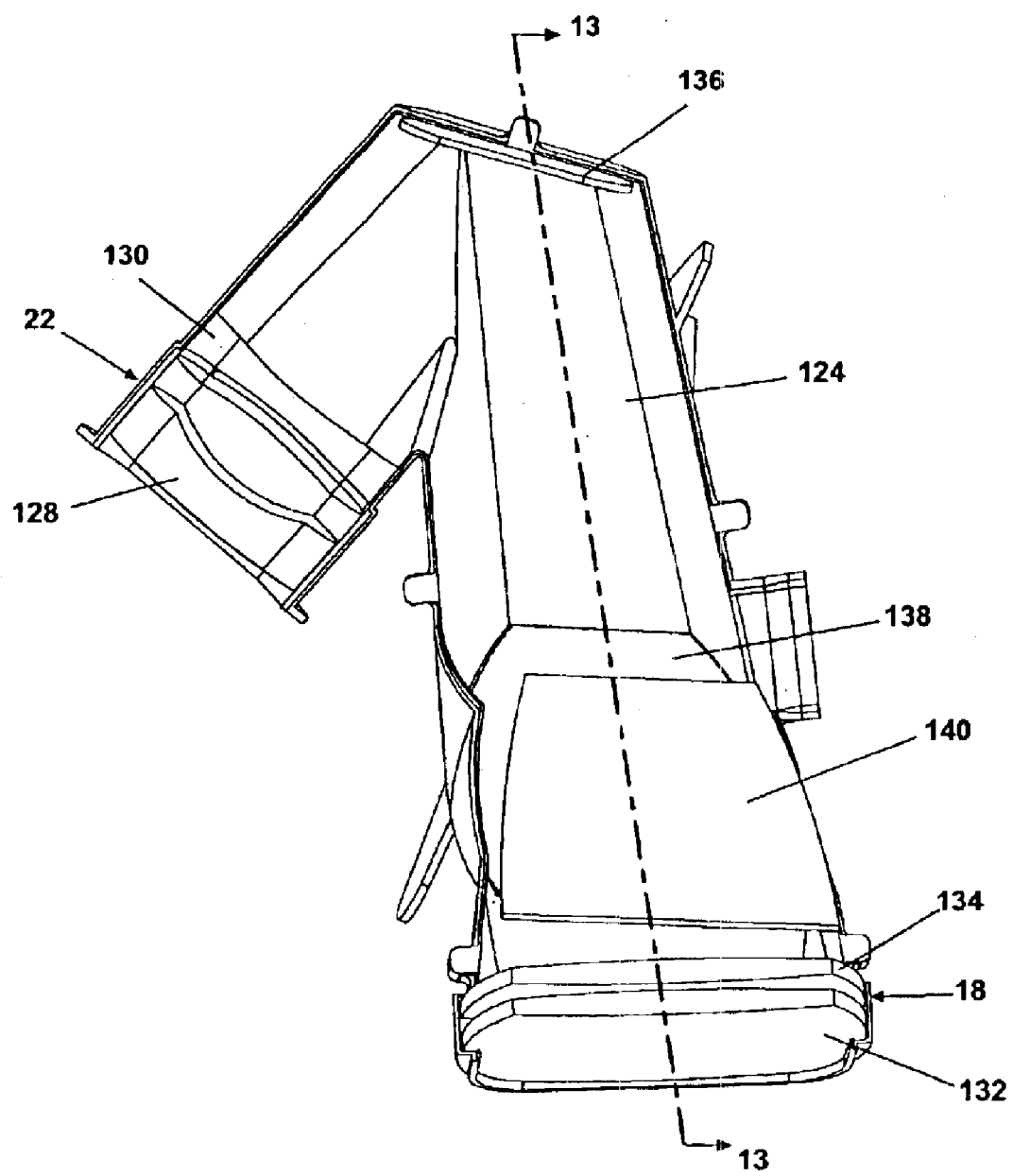
FIG. 12 is a plan view of the mirrors and lenses mounted in the lower housing shown in FIG. 11.
Figure 13:
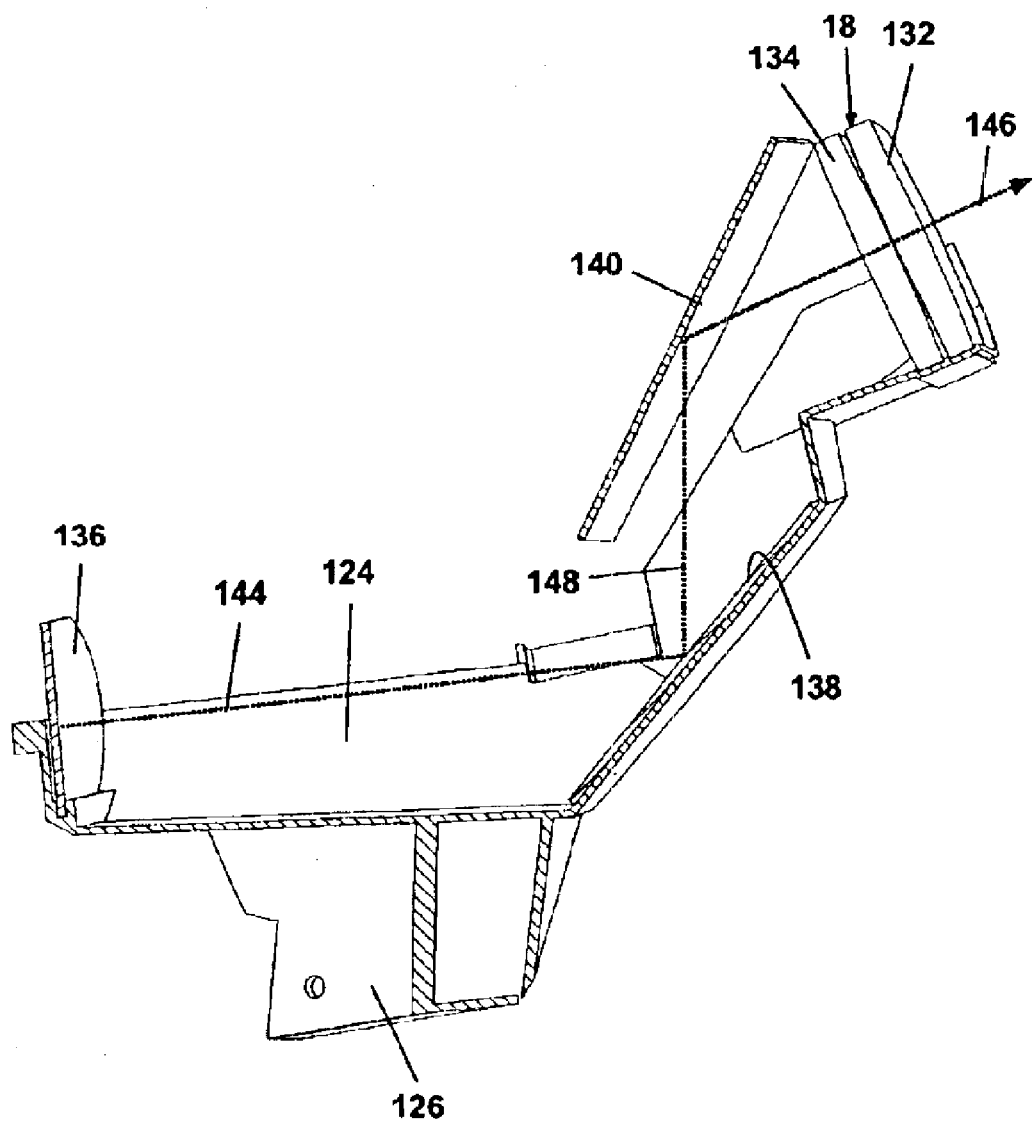
FIG. 13 is a cross-sectional view taken along line 13—13 of FIG. 12.
Figure 14:
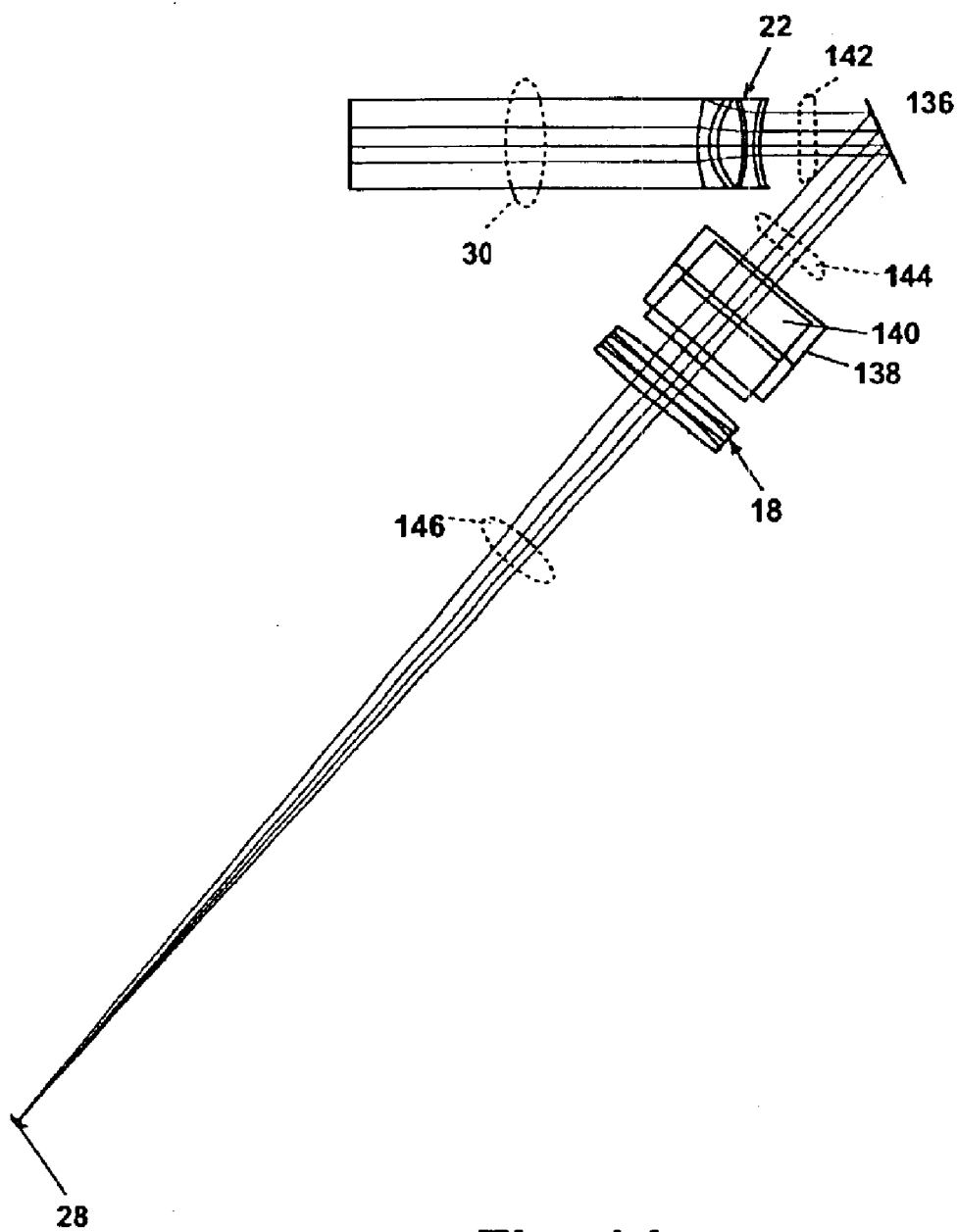
FIG. 14 is a schematic representation of the light received from an object and transmitted to a driver's eye through a sixth embodiment of the afocal rearview mirror assembly of FIG. 10.

Referring to FIGS. 12, 13, and 14, light 30 entering the objective lens 22 is converged afocally 142 on the vertex mirror 136, and reflected 144 toward the lower intermediate mirror 138. The lower intermediate mirror 138 reflects the light 148 onto the upper intermediate mirror 140 where it is reflected 146 and focused through the field lens 18 to be observed by the driver.

Figure 15:
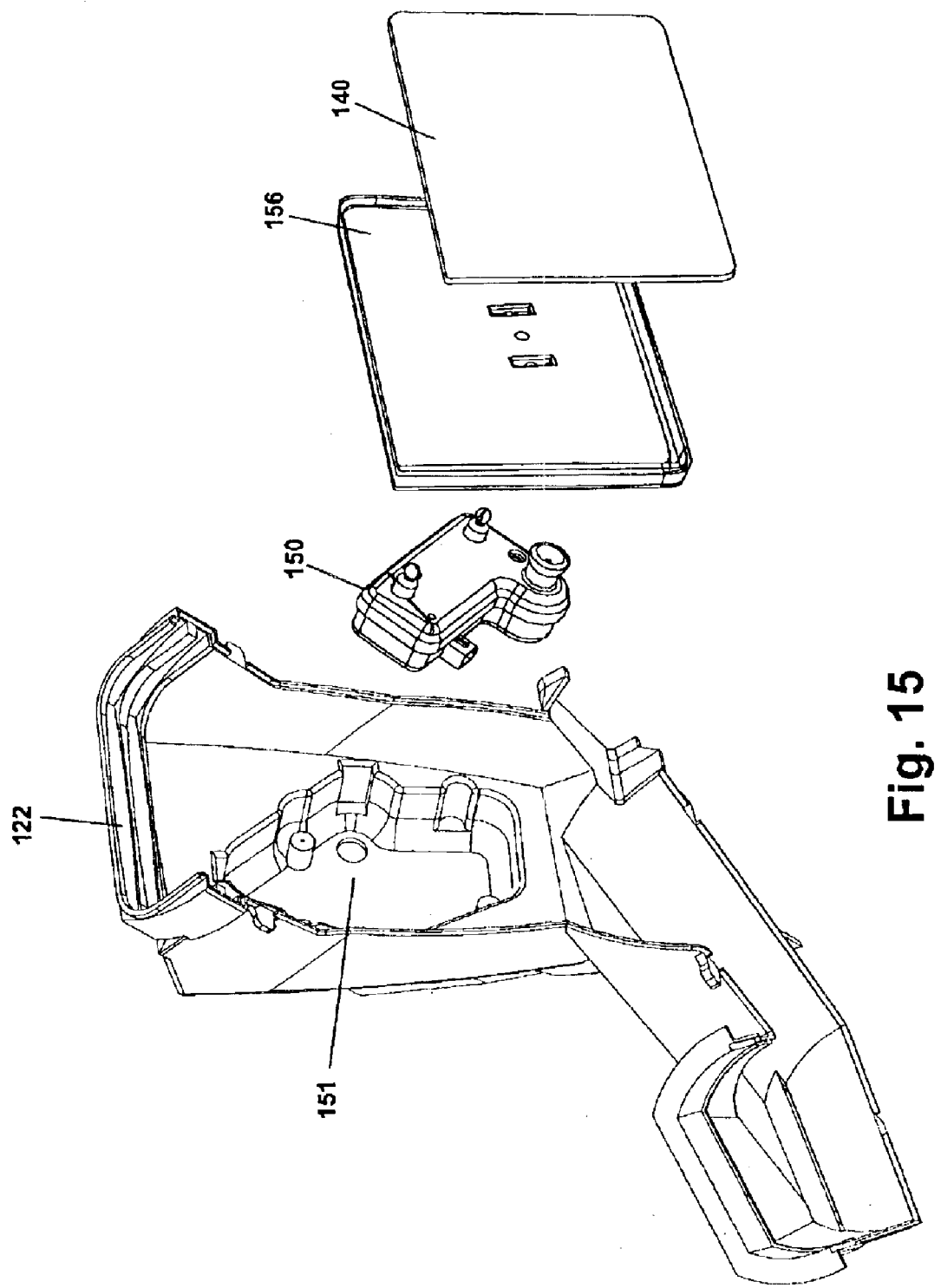
FIG. 15 is an exploded view of a portion of the upper housing shown in FIG. 10 showing a tilt actuator mounted to the upper housing for tilting an upper mirror about two orthogonal axes.
Figure 16:
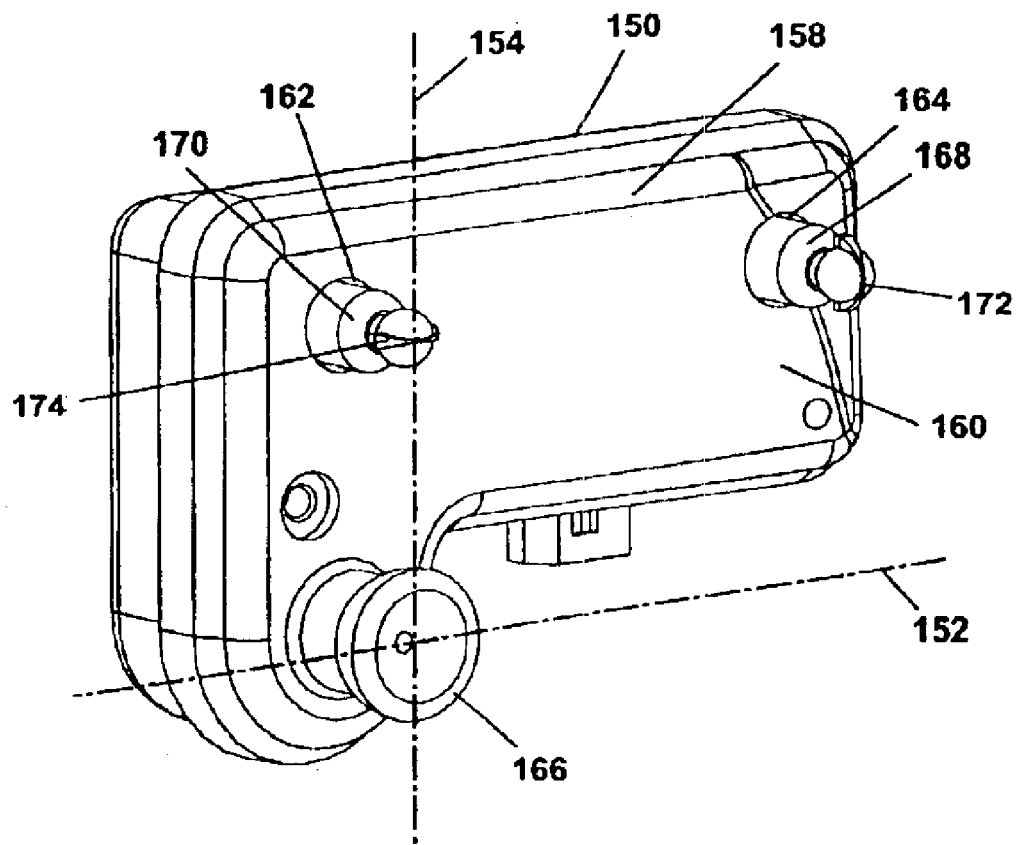
FIG. 16 is a close-up perspective view of the tilt actuator shown in FIG. 15.

The tilt actuator 150 is similar in essential respects to a tilt actuator for adjusting an external rearview mirror about a horizontal and a vertical axis. An example of such a tilt actuator is shown and described in PCT Application Serial No. PCT/US03/10866, filed Apr. 8, 2003, entitled "Vehicle Mirror Actuator With Single Motor Actuation And Inboard Center Of Gravity And Vehicular Mirror Incorporating The Same," which is fully incorporated herein by reference. As shown in FIGS. 15 and 16, the tilt actuator assembly 150 comprises an actuator case 158 having a cover 160 with a first aperture 162 and a second aperture 164 therethrough. The actuator case 158 encloses a pair of drive motors (not shown) and gear assemblies (not shown) adapted to drive a first jack screw 170 and a second jack screw 168 which extend through the apertures 162, 164, respectively. The actuator case 158 is also provided with a pivot mount 166 for mounting a mirror case 156 thereto which is adapted to hold the mirror case 156 to the actuator case 158 while enabling the mirror case 156 to tilt about the pivot mount 166 in a well-known manner.

The jack screws 168, 170 terminate in a pair of ball mounts 172, 174 which are adapted for connecting to the mirror case 156 in a snap fit attachment by inserting the ball mounts 172, 174 in mating sockets (not shown) mounted to the mirror case 156. The ball mounts 172, 174 and mating sockets are adapted to enable the mirror case 156 to pivot somewhat about the ball mounts 172, 174 while preventing the ball mounts from rotating in the sockets. As shown in FIG. 16, extension and retraction of the second jack screw 168 will cause the mirror case 156 to pivot about the longitudinal axis 154. Extension and retraction of both jack screws 168, 170 will cause the mirror case 156 to pivot about the transverse axis 152.

The upper intermediate mirror 140 is fixedly attached to the mirror case 156 in a well-known manner so that the mirror 140 will tilt with the tilting of the mirror case 156. Tilting of the mirror 140 will enable the driver to adjust his or her rearward field of vision in a manner similar to adjusting the rearward field of vision in a conventional tilt adjustable exterior rearview mirror.

The offset of the field lens 18 from the objective lens 22 provides for improved driver ergonomics by positioning the field lens 18 for optimum viewing by the driver, and away from interior vehicle components such as a dash assembly, vehicle controls, or ventilation outlets. The sixth embodiment shown in FIGS. 10–16 also eliminates an expander lens, thereby simplifying the structure of the mirror assembly.

The novel afocal rearview mirror assembly 12 is an improvement over the prior art in several unique ways. First, the afocal rearview mirror assembly 12 provides a flat field of view, thereby reducing or eliminating edge distortion present in the prior art. Second, the brightness of the image is significantly higher and clearer than the prior art. Third, the angular magnification is retained at approximately a 1:1 ratio, a significant improvement over the 4:1 angular magnification ratio of the prior art. Fourth, the novel afocal rearview mirror assembly 12 has a lower weight and lower manufacturing costs than the prior art. Finally, the novel afocal rearview mirror assembly 12 reduces eye strain in the driver.

While the invention has been specifically described in connection with certain specific embodiments thereof, it is to be understood that this is by way of illustration and not of limitation. Reasonable variation and modification are possible within the scope of the foregoing description and drawings without departing from the spirit of the invention.

What is claimed is:

1. An afocal rearview mirror assembly for a motor vehicle operated by an operator for producing an image of an object located outside the vehicle, comprising:

an interior element housing having a first longitudinal axis, an exterior element housing having a second longitudinal axis, the interior element housing in cooperative communication with the exterior element housing so that the first longitudinal axis and the second longitudinal axis define an acute angle therebetween, a reflective element assembly, at least a portion of which is located at the apex of the angle for reflecting light entering through the exterior element housing to exit through the interior element housing, an objective lens assembly adapted to converge light entering the exterior element housing onto the reflective element wherein the image produced an the reflective element is unfocused, and a field lens assembly adapted to diverge light reflected from the reflective element through the interior element housing wherein the image produced is focused at the operator's eyes.

2. The afocal rearview mirror assembly of claim 1 wherein the reflective element assembly comprises at least one plane mirror.

3. The afocal rearview mirror assembly of claim 2 wherein the reflective element assembly comprises a first plane mirror and a second plane mirror.

4. The afocal rearview mirror assembly of claim 3 wherein the reflective element assembly further comprises a vertical inverter element.

5. The afocal rearview mirror assembly of claim 4 wherein the vertical inverter element comprises at least one convex lens.

6. The afocal rearview mirror assembly of claim 4 wherein the vertical inverter element comprises at least one prism.

7. The afocal rearview mirror assembly of claim 4 wherein the vertical inverter element is interposed between the first plane mirror and the second plane mirror.

8. The afocal rearview mirror assembly of claim 3 wherein the objective lens assembly comprises at least one convex lens.

9. The afocal rearview mirror assembly of claim 3 wherein the field lens assembly comprises at least one concave lens.

10. The afocal rearview mirror assembly of claim 9 wherein the field lens assembly comprises a compound lens.

11. The afocal rearview mirror assembly of claim 10 wherein the compound lens comprises at least one concave lens.

12. The afocal rearview mirror assembly of claim 3 wherein the reflective element assembly further comprises a third mirror spaced away from the first plane mirror and the second plane mirror.

13. The afocal rearview mirror assembly of claim 12 wherein the first plane mirror and the second plane mirror are coplanar.

14. The afocal rearview mirror assembly of claim 1 wherein the objective lens assembly comprises at least one convex lens.

15. The afocal rearview mirror assembly of claim 1 wherein the field lens assembly comprises at least one concave lens.

16. The afocal rearview mirror assembly of claim 1 wherein the image produced on the reflective element is inverted.

17. The afocal rearview mirror assembly of claim 16 wherein the reflective element assembly is adapted to converge the light reflected from the reflective element.

18. The afocal rearview mirror assembly of claim 17 wherein the reflective element assembly is a concave mirror.

19. The afocal rearview mirror assembly of claim 16 wherein the light entering the exterior element housing is converged to a focal point in front of the reflective element assembly to invert the image.

20. The afocal rearview mirror assembly of claim 19 wherein the reflective element assembly is adapted to converge the light reflected from the reflective element.

21. The afocal rearview mirror assembly of claim 20 wherein the reflective element assembly is a concave mirror.

22. The afocal rearview mirror assembly of claim 16 wherein the field lens assembly comprises a compound lens.

23. The afocal rearview mirror assembly of claim 22 wherein the compound lens comprises at least one concave lens.

24. The afocal rearview mirror assembly of claim 22 wherein the field lens assembly further comprises an aperture for diverging and inverting the image.

25. The afocal rearview mirror assembly of claim 24 wherein the aperture is located between the reflective element assembly and the compound lens.

26. The afocal rearview mirror assembly of claim 1 wherein the objective lens is adapted to provide a wide-angle view.

27. The afocal rearview mirror assembly of claim 26 wherein the objective lens comprises at least one negative lens.

28. The afocal rearview mirror assembly of claim 26 wherein the objective lens comprises at least one compound lens.

29. A rearview mirror assembly mounted to the side of a motor vehicle operated by an operator fur producing an image of an object located outside the vehicle, comprising:
   an interior element housing having a first longitudinal axis, an exterior element housing having a second longitudinal axis, the interior element housing in cooperative communication with the exterior element housing so that the first longitudinal axis and the second longitudinal axis define an acute angle therebetween,
   a reflective element assembly, at least a portion of which is located at the apex of the angle for reflecting light entering through the exterior element housing to exit through the interior element housing,
   a first light conditioning assembly adapted to receive light entering the exterior element housing,
   a second light conditioning assembly adapted to transmit light reflected from the reflective element through the interior element housing wherein the image produced is focused at the operator's eyes, and
   wherein the image projected onto the reflective element assembly is unfocused.

30. The rearview mirror assembly of claim 29 wherein the reflective element assembly comprises at least one plane mirror.

31. The rearview mirror assembly of claim 30 wherein the reflective element assembly comprises a first plane mirror and a second plane mirror.

32. The rearview mirror assembly of claim 31 wherein the reflective element assembly further comprises a vertical inverter element.

33. The rearview mirror assembly of claim 32 wherein the vertical inverter element comprises at least one convex lens.

34. The rearview mirror assembly of claim 33 wherein the vertical inverter element comprises at least one prism.

35. The rearview mirror assembly of claim 33 wherein the vertical inverter element is interposed between the first plane mirror and the second plane mirror.

36. The rearview mirror assembly of claim 33 wherein the first light conditioning assembly comprises at least one convex lens.

37. The rearview mirror assembly of claim 33 wherein the second light conditioning assembly comprises at least one concave lens.

38. The rearview mirror assembly of claim 37 wherein the second light conditioning assembly comprises a compound lens.

39. The rearview mirror assembly of claim 38 wherein the compound lens comprises at least one concave lens.

40. The rearview mirror assembly of claim 32 wherein the reflective element assembly further comprises a third mirror spaced away from the first plane mirror and the second plane mirror.

41. The rearview mirror assembly of claim 40 wherein the first plane mirror and the second plane mirror are coplanar.

42. The rearview mirror assembly of claim 29 wherein the first light conditioning assembly comprises at least one convex lens.

43. The rearview mirror assembly of claim 29 wherein the second light conditioning assembly comprises at least one concave lens.

44. The rearview mirror assembly of claim 29 wherein the image produced on the reflective element is inverted.

45. The rearview mirror assembly of claim 44 wherein the reflective element assembly is adapted to converge the light reflected from the reflective element.

46. The rearview mirror assembly of claim 45 wherein the reflective element assembly is a concave mirror.

47. The rearview mirror assembly of claim 45 wherein the light entering the exterior element housing is converged to a focal point in front of the reflective element assembly to invert the image.

48. The rearview mirror assembly of claim 47 wherein the reflective element assembly is adapted to converge the light reflected from the reflective element.

49. The rearview mirror assembly of claim 48 wherein the reflective element assembly is a concave mirror.

50. The rearview mirror assembly of claim 45 wherein the second light conditioning assembly comprises a compound lens.

51. The rearview mirror assembly of claim 50 wherein the compound lens comprises at least one concave lens.

52. The rearview mirror assembly of claim 51 wherein the second light conditioning assembly further comprises an aperture for diverging and inverting the image.

53. The rearview mirror assembly of claim 52 wherein the aperture is located between the reflective element assembly and the compound lens.

54. The rearview mirror assembly of claim 29 wherein the first light conditioning assembly is adapted to provide a wide-angle view.

55. The rearview mirror assembly of claim 54 wherein the first light conditioning assembly comprises at least one negative lens.

56. The rearview mirror assembly of claim 55 wherein the first light conditioning assembly comprises at least one compound lens.

* * * * *

UNITED STATES PATENT AND TRADEMARK OFFICE
CERTIFICATE OF CORRECTION

| | |
|---|---|
| PATENT NO. | : 6,862,146 B2 |
| DATED | : March 1, 2005 |
| INVENTOR(S) | : James A. Ruse and Paul L. Bourget |

It is certified that error appears in the above-identified patent and that said Letters Patent is hereby corrected as shown below:

<u>Column 8,</u>
Line 59, reads "wherein the image produced an the" it should read -- wherein the image produced on the --

<u>Column 10,</u>
Line 11, reads "motor vehicle operated by an operator fur producing an" it should read -- motor vehicle operated by an operator for producing an --

Signed and Sealed this

Twenty-fourth Day of May, 2005

JON W. DUDAS
*Director of the United States Patent and Trademark Office*